(12) United States Patent  
Lillibridge et al.

(10) Patent No.: US 9,195,665 B2  
(45) Date of Patent: Nov. 24, 2015

(54) METHOD AND SYSTEM FOR DATA RETENTION

(75) Inventors: Mark D. Lillibridge, Palo Alto, CA (US); Kave Eshghi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1163 days.

(21) Appl. No.: 11/414,481

(22) Filed: Apr. 28, 2006

(65) Prior Publication Data

US 2007/0276843 A1   Nov. 29, 2007

(51) Int. Cl.  
*G06F 7/04* (2006.01)  
*G06F 17/30* (2006.01)

(52) U.S. Cl.  
CPC .... *G06F 17/30073* (2013.01); *G06F 17/30085* (2013.01)

(58) Field of Classification Search  
CPC ..... G06F 21/60; G06F 21/6245; G06F 21/10; G06F 21/6218; G06F 21/6205  
USPC .......................................... 713/176; 707/100  
See application file for complete search history.

(56) References Cited

U.S. PATENT DOCUMENTS

| | | | |
|---|---|---|---|
| 5,781,626 A * | 7/1998 | Koue | 379/361 |
| 5,781,629 A * | 7/1998 | Haber et al. | 713/177 |
| 5,987,252 A | 11/1999 | Leino et al. | |
| 6,085,216 A | 7/2000 | Huberman et al. | |
| 6,195,698 B1 | 2/2001 | Lillibridge et al. | |
| 6,353,925 B1 | 3/2002 | Stata et al. | |
| 6,584,459 B1 | 6/2003 | Chang | |
| 6,614,764 B1 | 9/2003 | Rodeheffer et al. | |
| 6,654,743 B1 | 11/2003 | Hogg et al. | |
| 6,721,275 B1 | 4/2004 | Rodeheffer et al. | |
| 6,756,994 B1 | 6/2004 | Tlaskal | |
| 7,082,505 B2 | 7/2006 | Chen | |
| 7,526,621 B2 * | 4/2009 | Stuart et al. | 711/159 |
| 2004/0107346 A1 | 6/2004 | Goodrich | |
| 2005/0038699 A1 | 2/2005 | Lillibridge et al. | |
| 2005/0038774 A1 | 2/2005 | Lillibridge et al. | |
| 2005/0055380 A1 | 3/2005 | Thompson | |
| 2006/0156382 A1 * | 7/2006 | Motoyama | 726/1 |
| 2008/0032669 A1 * | 2/2008 | Carroll | 455/410 |
| 2008/0320147 A1 * | 12/2008 | DeLima et al. | 709/227 |

OTHER PUBLICATIONS

Mark Lillibridge, Translucent Sums: A Foundation for Higher-Order Module Systems, Dec. 12, 1996.  
Mark Lillibridge, Exceptions Are Strictly More Powerful Than Call/CC, Jul. 1995.  
Mark Lillibridge, Unchecked Exceptions can be Strictly More Powerful than Call/CC, Nov. 25, 1995.  
Robert Harper and Mark Lillibridge, Operational Interpretation of an Extension of Fw with Control Operators, Jan. 1993.  
Robert Harper and Mark Lillibridge, Polymorphic Type Assignment and CPS Conversion, 1993.

(Continued)

*Primary Examiner* — Fikremariam A Yalew  
(74) *Attorney, Agent, or Firm* — Trop, Pruner & Hu, P.C.

(57) ABSTRACT

Embodiments of the present invention relate to a system and method of document retention with policy-controlled deletion. Embodiments of the present invention comprise committing to a plurality of documents, deleting one of the plurality of documents, and providing a proof of authorized deletion of the one of the plurality of documents in response to an audit request.

14 Claims, 10 Drawing Sheets

(56) References Cited

OTHER PUBLICATIONS

Mark Lillibridge, et al., A Cooperative Internet Backup Scheme, Jun. 2003.
Cormac Flanaganet al., Extended Static Checking for Java, Jun. 2002.
Philippe Golle, et al., Incentives for Sharing in Peer-to-Peer Networks, Nov. 2001.
Robert Harper, et al., A Type-Theoretic Approach to Higher-Order Modules with Sharing, Jan. 1994.
Robert Harper, et al., Explicit Polymorphism and CPS conversion, Jan. 1993.
Robert Harper, et al., Polymorphic Type Assignment and CPS Conversion, Jun. 1992.
Bernardo A. Huberman and Rajan M. Lukose, Social Dilemmas and Internet Congestion, Jul. 25, 1997.
Bernardo A. Huberman et al., Strong Regularities in World Wide Web Surfing, Apr. 1998.
Rajan M. Lukose, et al., Surfing as a Real Option, 1998.
Lada A. Adamic, Search in power-law networks, Sep. 26, 2001.
Dejan S. Milojicic, et al., Peer-to-Peer Computing, Mar. 8, 2002.
Eytan Adar, et al., Shock: Aggregating Information While Preserving Privacy, 2003.
Lada A. Adamic et al., Local Search in Unstructured Networks, Jun. 3, 2002.
Rajan M. Lukose, Shock: Communicating with Computational Messages and Automatic Private Profiles, 2003.
A Methodology for Managing Risk in Electronic Transactions over the Internet, 2000.
Marcos K. Aguilera, et al., Block-Level Security for Network-Attached Disks, Mar. 2003.
Rafail Ostrovsky, et al., Efficient Consistency Proofs for Generalized Queries on a Committed Database, Jul. 20, 2004.
Silvio Micali, et al., Zero-Knowledge Sets, 2003.
Ralph C. Merkle, Protocols for Public Key Cryptosystems, 1980.
Chip Martel, et al., A General Model for Authenticated Data Structures, Dec. 6, 2001.
Stuart Haber, et al., How to Time-Stamp a Digital Document, 1991.
Petros Maniatis, et al., Enabling Long-Term Archival of Signed Documents through Time Stamping.
William Pugh, Skip Lists: A Probabilistic Alternative to Balanced Trees, Jun. 1990.

* cited by examiner

METHOD AND SYSTEM FOR DATA RETENTION

BACKGROUND

Computer archive systems include computer systems that store documents (e.g., immutable documents). These documents are also referred to herein as files and can include any form of stored data. An archive system comprises one or more separate computers having specialized archive software and access to a large amount of storage space (e.g., hard drives, magnetic tapes). Archive systems are often owned or operated by a party that provides storage space and related services to clients. During typical operation of an archive system, a client acquires a restricted account on the system to allow for storage and retrieval of electronic documents. Archive systems facilitate retrieval of such stored documents by utilizing document identification codes. For example, when presented with a document by a client, certain types of computer archive systems produce a short and unique document identification code (document ID) that refers to that particular document.

After a document ID is assigned, an archive system operator or client can typically retrieve that document from the computer archive system at any time before it has been deleted by requesting that document ID. Whether a requested document is on disk or on tape, a typical archive system is adapted to locate it and retrieve a copy. However, archive systems frequently fail to properly maintain documents and document copies. Indeed, equipment and equipment operators are subject to failure or inadequate performance. For example, typical archive systems create potential for error by periodically copying documents from hard drive storage space to other storage media (e.g., disk, tape) to improve cost efficiency. Further, such storage media are handled within the archive system by a robot system, which introduces more potential for error in the retrieval of thousands of storage media. Situations occur in which some documents are lost, damaged, overwritten, and so forth. In certain situations, unscrupulous individuals can attempt to compromise archive security by attempting to directly or indirectly seek the destruction or corruption of archived information. For example, under some circumstances (e.g. embezzlement), other parties can attempt to bribe the archive operator to purposely delete particular documents. Accordingly, clients of archive systems frequently do not trust their computer archive systems or their archive system operators and wish to have guarantees of data retention. Also, it is now recognized that it is desirable for clients to be able to delete certain documents from the archive without enabling the archive operators to make deletions at will.

DETAILED DESCRIPTION

Figure 1:
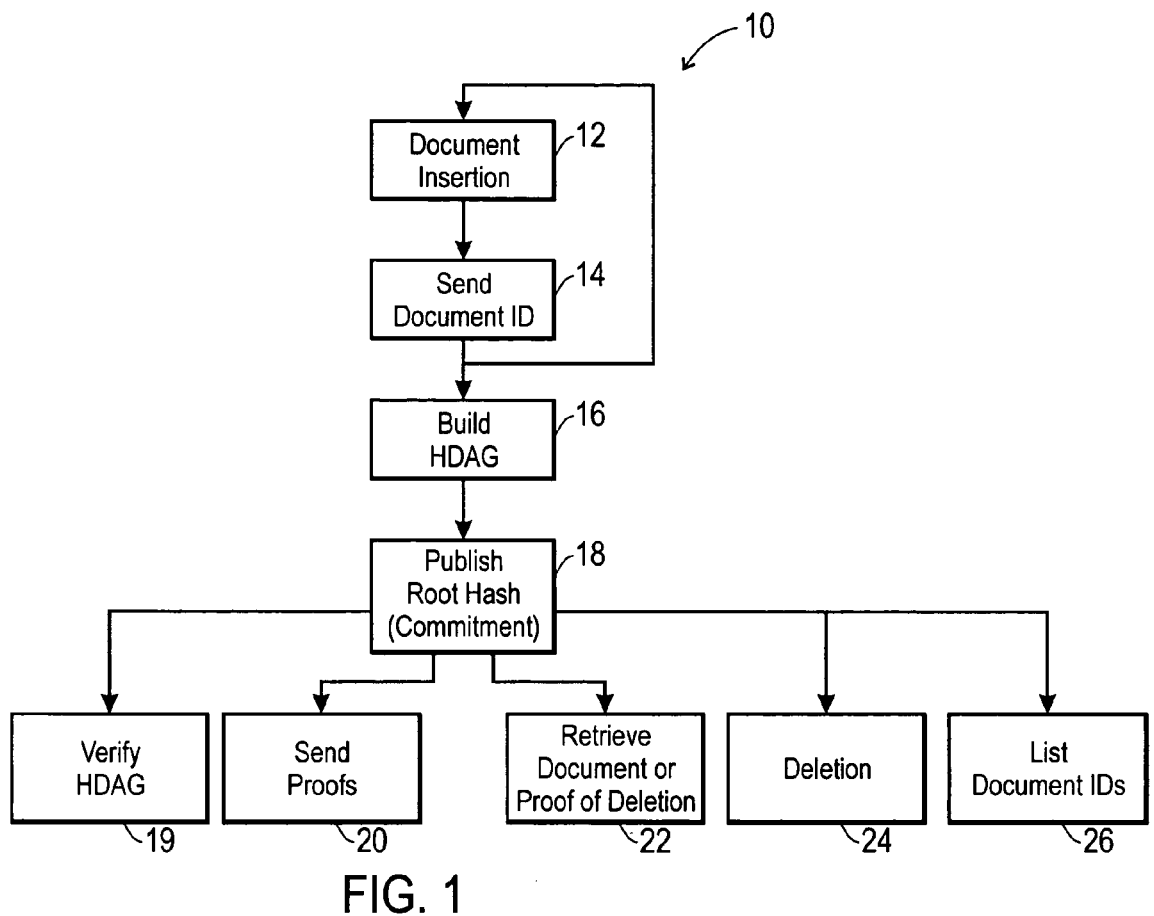
FIG. 1 is a block diagram of a method for providing computer archive system accountability and allowing deletion illustrating one embodiment of the present invention.

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation specific goals, such as compliance with system-related and business-related constraints, can vary from one implementation to another. Moreover, it should be appreciated that such a development effort can be complex and time consuming but would nevertheless be a routine understanding of design, fabrication, and manufacture for those of ordinary skill having the benefit of this disclosure.

Embodiments of the present invention relate to assured document retention and accountable computer archive systems. Documents are also referred to herein as files and can include any form of stored data. Document retention is the systematic retention of data for time periods depending on data type. For example, companies frequently retain certain documents because of government regulations. Indeed, the government can require that data of a certain type (e.g., data relevant to a tax return) be retained for a defined number of years. Accountable computer archive systems are herein defined to include systems that provide assurance that data is managed in accordance with a predefined data storage management policy. In one embodiment of an accountable computer archive system, the system stores documents, disallows stored documents to be changed in a manner other than being deleted, and holds system operators accountable for storage related issues.

Specifically, embodiments of the present invention relate to an accountable computer archive system that allows for deletion. It is now recognized that it is beneficial for computer archive systems to be accountable while still allowing for deletion of files. Indeed, entities frequently wish to permanently destroy certain documents that it would otherwise be beneficial to retain in an accountable computer archive system. For example, when a required retention period for certain documents has elapsed (e.g., the government no longer requires that the information remain accessible), a company will likely wish to delete the documents. Such deletions can be for legitimate purposes, such as to improve efficiency, to limit liabilities, and so forth. However, such deletions can also be inappropriate. For example, a document can be deleted to prevent discovery in litigation. In order to guard against inaccuracies, improprieties, and the appearance of impropriety, it is desirable to be capable of showing that certain documents were deleted after reasonable and customary business procedures. For example, to avoid allegations of improper conduct it is desirable to be able to show that certain documents were deleted in due course instead of being deleted because an investigation was pending. Additionally, it is desirable to be able to show when documents were originally inserted into the archive system and that the documents have not been modified since insertion.

Some computer archive systems in accordance with present embodiments can assign multiple distinct document IDs to the same document, especially if it has been saved multiple times. A document paired with one of its document IDs is referred to herein as an instance of that document. Some computer archive systems in accordance with present embodiments permit the deleting of only one instance of a given document rather than all of its instances at once.

The present disclosure describes a system and method for building and establishing archive system accountability while permitting file deletion. First, provision of accountable archive systems is discussed and then document deletion within such systems is discussed. Accountable archive systems can reduce the trust clients, owners, and other users need place in their archive systems, archive system providers, and archive system operators. For example, regarding a document instance without status as an authorized deletion, if an archive system provider reneges on its contract with a client by returning an incorrect (changed) document when asked for the document corresponding to the instance's document ID, then the document instance requestor will have provable indications of this failure. Such failures can invoke agreed upon penalty clauses, which facilitates outsourcing of document retention. Further, embodiments of the present invention facilitate automatic audits with verifiable results to ensure that documents submitted to the system are handled according to relevant policies.

FIG. 1 is a block diagram of a method for providing computer archive system accountability illustrating one embodiment of the present invention. The method is generally referred to by reference numeral 10. In one embodiment of the present invention, the blocks in the illustrated method 10 do not operate in the illustrated order. Further, while FIG. 1 separately delineates specific method operations as individual blocks, in other embodiments, individual operations are split into multiple operations. Similarly, in some embodiments, multiple operations are combined into a single operation.

Block 12 of FIG. 1 represents insertion of a document into an archive system. The insertion represented by block 12 comprises a plurality of operations. For example, in some embodiments of the present invention, an archive system receives a document, assigns it a document ID, and stores it with other documents submitted during a designated period (e.g., all documents submitted that day). The document ID is used to reference the associated document. Block 14 represents sending the assigned document ID to a client or other user. In some embodiments of the present invention, the document ID is immediately sent to the client after being assigned.

Block 16 represents building an HDAG (hash-based directed acyclic graph) that unambiguously specifies the documents in the archive and their associated document IDs. An HDAG is herein defined as a DAG (directed acyclic graph) wherein pointers hold cryptographic hashes rather than addresses. A cryptographic hash (shortened to hash in this document) is defined herein as a small number produced from arbitrarily-sized data by a mathematical procedure called a hash function (e.g., MD5, SHA-1) such that (1) any change to the input data (even one as small as flipping a single bit) with extremely high probability changes the hash and (2) given a hash, it is impractical to find any data that maps to that hash that is not already known to map to that hash. Because it is highly unlikely to find two pieces of data that have the same hash, a hash can be used as a reference to the piece of data that produced it; such references are called intrinsic references because they depend on the content being referred to, not where the content is located. Traditional addresses, by contrast, are called extrinsic references because they depend on where the content is located.

A DAG is herein defined as a graph having directed edges without a path that returns to the same node. The node an edge emerges from is called the parent of the node that edge points to, which in turn is called the child of the original node. Each node in a DAG is either a leaf or an internal node in accordance with present embodiments. An internal node has one or more child nodes whereas a leaf node is childless. The children of a node, their children, and so forth are the descendents of that node and all children of the same parent node are siblings. If every child node has one parent node in a DAG and every node in the DAG is reachable from a single node called the root node, then that DAG is a tree. Computer trees are usually depicted with their root at the top of the structure and their leaves at the bottom. HDAGs that are trees are sometimes referred to as Merkle Trees. Once the new HDAG is constructed, its root cryptographic hash (root hash) is published, as illustrated by block 18.

Figure 2:
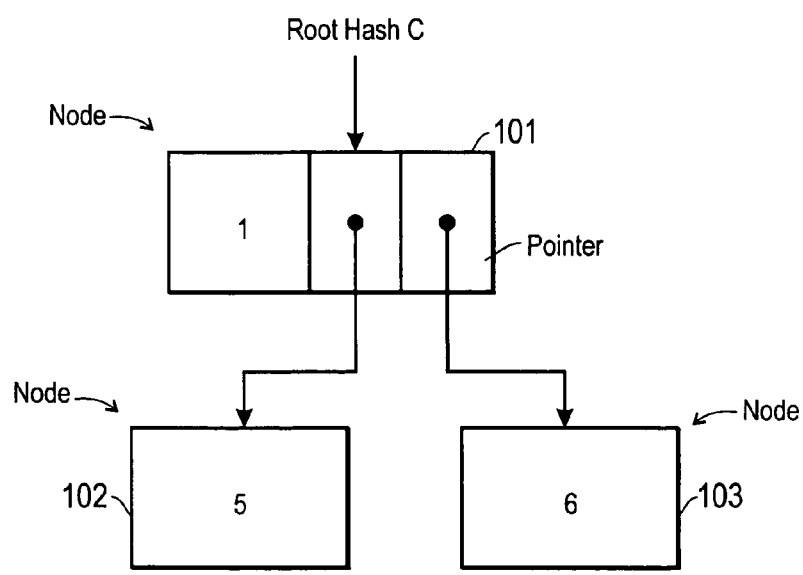
FIG. 2 is a block diagram that illustrates an hash-based directed acyclic graph (HDAG) wherein pointers hold cryptographic hashes illustrating one embodiment of the present invention.

FIG. 2 is a block diagram of an HDAG wherein pointers hold cryptographic hashes. Because HDAGs use intrinsic references instead of extrinsic references, they have special properties. In particular, any change to the contents of an HDAG with extremely high probability changes all references to it and any subpart of it whose contents have changed. This makes HDAGs useful for committing to a set of values. For example, the following represents a set commitment method: To commit to a set S (e.g., a set of numbers), the committer (e.g., computer archive system) builds an HDAG whose nodes contain the elements of S. One possible such HDAG encoding {1, 5, 6} is shown in FIG. 2. The root hash C (i.e., hash of the root node) depends on the entire HDAG, thus the committer will be unable to change the set once C is published. It should be noted that C is the hash of the entire root node, including the two pointers to its children, and thus depends indirectly on its children's contents, and their children's contents, and so on.

Specifically, in accordance with embodiments of the present invention, an HDAG is produced that incorporates information relating to received documents (e.g., the documents and their assigned IDs). In some embodiments of the present invention, the HDAG is produced at the end of a period (e.g., end of a day) to allow for inclusion of all documents submitted during the period. Once the HDAG is constructed, its root cryptographic hash (root hash) is published, as illustrated by block 18. In some embodiments of the present invention, a computer archive system widely publishes the root cryptographic hash of the HDAG once each period. Further, in some embodiments of the present invention, the HDAG for a particular period contains a pointer to the previous period's HDAG. However, there are exceptions to such embodiments that facilitate conservation of storage space. For example, on a day without any document insertions, that day's HDAG is simply identified as being the same as the previous day's HDAG. In this way, the archive system can essentially irrevocably commit to the accepted documents and their assigned document IDs. Clients and other users can verify that each period's HDAG is sufficiently correctly formatted and includes the information from the previous period's HDAG (block 19). It is assumed, in accordance with one embodiment of the present invention, that clients and other users have access to the most recently published root hash, but not to previously published values (in a timely or cost effective manner).

Block 20 represents sending each user that submitted a document during the recent period a proof that their newly inserted documents and associated document IDs are properly included in the newly published HDAG. These proofs, checked by the clients, allow the clients to be sure that their documents have actually been placed in the archive. In some embodiments of the present invention, a proof of inclusion contains the relevant HDAG nodes including all of the nodes on a path from the root node to a given node, the presence and contents of which are being proven. For example, in reference to FIG. 2, to prove that a particular element (e.g., value five) is in the set to which the committer committed, the committer merely supplies the contents of all of the nodes (inclusive) on the path from the root node to the node containing that element. In the case of element value five in FIG. 2, this would be node 101 followed by node 102. The advantage of sending just a path to the node containing that element instead of the contents of the entire HDAG is that a path is often exponentially smaller than the entire HDAG. A skeptical observer (e.g., a client) can verify such proofs by checking that the first node hashes to the published root hash C, each succeeding node's hash is contained in the preceding node as a pointer value, and that the final node contains the element whose presence is being proved. This method of proof is presented generally as: the presence of an arbitrary subset of nodes in an HDAG can be proved by supplying them and all their ancestors' contents. Accordingly, using the published root hash, the client or other users can check the proof.

Block 22 represents attempting to retrieve the document instance having a particular document ID. For example, when the document ID is valid and the document instance has not been properly deleted, the archive system first proves to the user that the hash of the document associated with the given document ID is H under the currently committed-to HDAG. The archive system then provides the user with a document having hash H. This is the right document, because it is computationally infeasible for the archive to find a different document with the same hash. Alternatively, in an invalid document ID case, the archive system provides the client with a proof that the given document ID is invalid according to the currently committed-to HDAG. The client then checks the proof When the document instance associated with the document ID has been properly deleted, the archive system provides the client with proof of a valid deletion request for that document instance, as will be discussed in further detail below. It should be noted that the client can also request deletion as illustrated by block 24. This deletion request is verified by the archive system, as discussed in further detail below.

Block 26 represents listing the document IDs of all the document instances in the archive system, possibly including the deleted ones. In some embodiments of the present invention, this comprises providing the entire HDAG for the current period to a user. The user can then verify that the root hash of the provided HDAG matches the current period's published root hash and that all the internal hashes for the provided HDAGs are internally consistent. Additionally, block 26 represents user extraction of the document IDs from the HDAG. In one embodiment of the present invention, the root node of the HDAG is utilized alone in this operation.

While other embodiments are presently disclosed, three specific embodiments (Embodiment A, Embodiment B, and Embodiment C) of the present invention relating to building an accountable computer archive system are presented below. Each embodiment reflects a different trade-off among efficiencies and benefits associated with the archive operations illustrated in FIG. 1. Each of these embodiments is preferable for a particular archive system, depending on the design criteria for specific systems. Embodiment A relates to assigning document IDs in sequential order in block 12, thus allowing the use of relatively short document IDs and conserving storage space. Embodiment B relates to assigning each document's hash as its document ID in block 12, thus reducing required proofs at the expense of storage space. Embodiment C relates to assigning each document's hash combined with a round number as its document ID in block 12, thus reducing required time for invalid document ID retrieval at the expense of storage space.

In Embodiment A, block 12 comprises assigning sequential document IDs. For example, a first inserted document is assigned ID 1, a second (new) document is assigned ID 2, and so forth. In one embodiment, reassignment of document IDs to a different document after their corresponding document instances have been deleted is prevented. When a client inserts a document that has already been inserted into the archive albeit possibly already deleted, the archive system can return a document ID already assigned to that document or it can assign a new document ID to that document. The first choice reuses an existing document instance, while the latter choice creates a new document instance.

Reusing document instances saves space, especially when the same documents are inserted over and over again. However, reusing document instances can lead to unexpected deletion results. Consider a case where two employees have both unknowingly inserted the same document into an archive. Later, the first employee deletes his instance. If a single instance was used, then this will also have the effect of unexpectedly deleting the second employee's copy. Alternatively, the computer archive system can reuse an already deleted document instance, which can be unexpected.

Accordingly, in one embodiment of the present invention, an archive client can ensure that he receives a new document instance of his inserted document or at least a document instance that is unshared with other clients. For example, one way for the archive client to do this is to prepend a large random number to his document. If he uses the same large random number for each of his documents (different from other clients' random numbers) or indeed a number excluded from use by others for this purpose, he will prevent sharing of his document instances with other clients but his insertions can share document instances among themselves. In some embodiments, the number can be put in other parts of the document than the beginning so long as it changes the document's hash. Alternatively, the client can require the computer archive system to prove to him as part of block 20 that the returned document ID belongs to a new document instance and/or that the returned document ID's instance is yet undeleted.

Using sequential document IDs allows for very short document IDs because, for example, if N insertions will be done, then log N bits are required per document ID. The HDAG built in block 16, in accordance with Embodiment A, contains a list of all the hashes of the inserted documents in reverse order. That is, the first element of the list is the cryptographic hash of the most recently inserted document, the second element of the list is the cryptographic hash of the second most recently inserted document, and so on until the last element of the hash list, which is the cryptographic hash of the first document inserted. It should be noted that this list unambiguously specifies the set of documents inserted in the archive and their document IDs. Further, it should be noted that, in one embodiment of the present invention, a document ID is deemed valid if and only if it is positive and less than or equal to the number of elements in the list.

The basic archive operations illustrated in FIG. 1 relate in embodiment A to proofs of the following forms: (1) there are exactly D elements in the hash list and (2) the $i^{th}$ element from the end of the hash list is $h_i$. The first form of proof is used to prove that a document ID is invalid because it is greater than D and to prove that the set of valid document IDs is 1 . . . D. The second form of proof is used to prove that document ID i is associated with the document having hash hi during valid retrieval (block 22) and document insertion verification (block 20).

Figure 3:
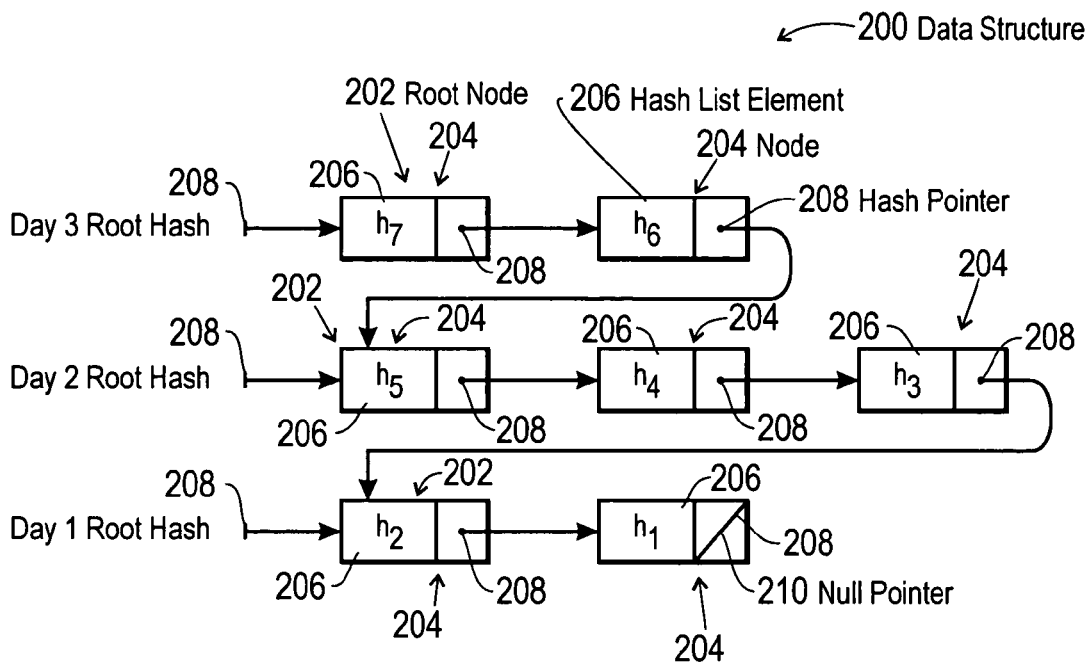
FIG. 3 illustrates a linked-list HDAG data structure representing a hash list illustrating one embodiment of the present invention.

FIG. 3 is a block diagram of a simple linked-list HDAG data structure representing a hash list illustrating one embodiment of the present invention. Specifically, FIG. 3 illustrates several instances of a data structure 200 in accordance with Embodiment A having root nodes 202 (one root node per instance), nodes 204, hash list elements 206 (e.g., $h_7$, $h_6$, $h_5$, $h_4$), and hash pointers 208. One instance is shown for each of three sequential periods (e.g., three sequential days). Note that succeeding day versions incorporate the previous versions by reference. Null hash pointers 210 are indicated in the structure 200 by a slash. In accordance with embodiments of the present invention, the null pointers 210 hold a special hash value null (e.g., 0) that corresponds to no known data. This data structure 200 is used to represent the hash list. With data structure 200, both forms of proof include returning the entire HDAG, which takes O(D) space, where D is the number of document insertions to the archive system so far.

Figure 4:
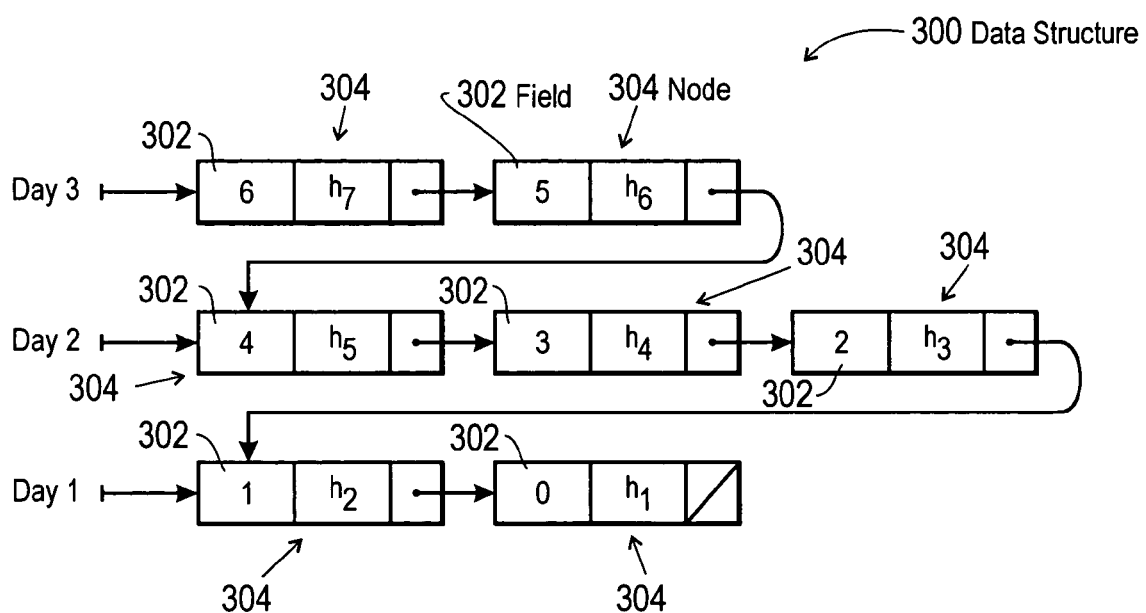
FIG. 4 illustrates an HDAG data structure including fields holding the size of the remaining list in the nodes illustrating one embodiment of the present invention.

FIG. 4 is a block diagram of a data structure 300 including fields 302 holding the size of the rest of the list in each node 304 illustrating one embodiment of the present invention. Specifically, data structure 300 is a data structure in accordance with Embodiment A that is relatively efficient compared to data structure 200. By including the size of the rest of the list in each node of data structure 300, the required proofs about data structure 300 are made more efficient than those about data structure 200. In reference to data structure 300, proving that the list has D elements includes showing the first node (O(1) space), which is labeled with the entire size of the list less one. This works if the users can trust the size labels 302. Further, this can be ensured by having users verify the size labels 302 of all the new nodes in each new HDAG. In accordance with embodiments of the present invention, this is done once a period, for example, when the archive system publishes a new HDAG root hash (i.e., as part of block 19). For the data structure 300, this verification takes time proportional to the number of document instances added to the archive during the relevant period. The labels of nodes belonging to the previous period's HDAG can be trusted because they have been verified in earlier periods (block 19).

Figure 5:
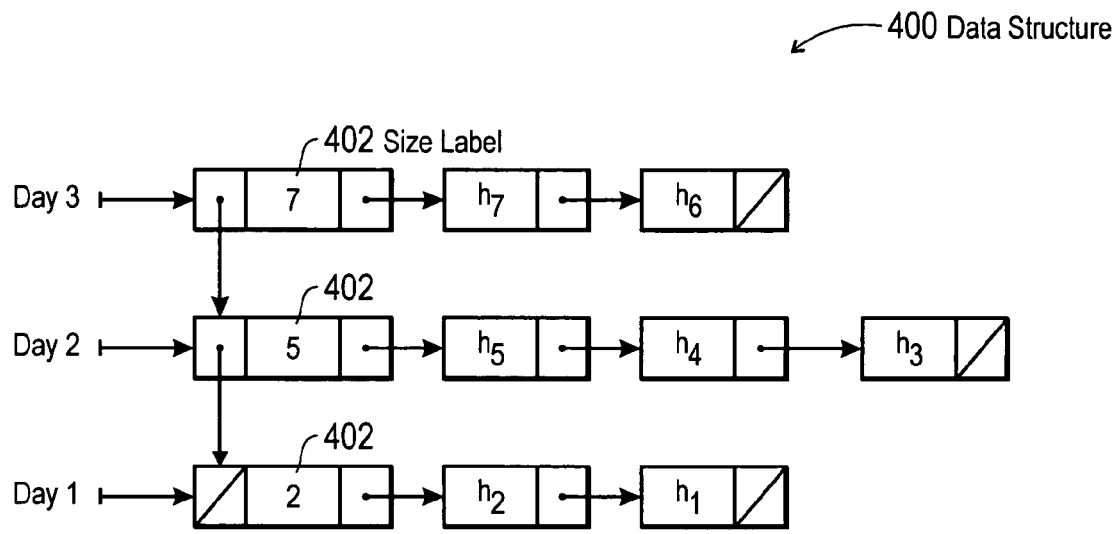
FIG. 5 illustrates an HDAG data structure representing a hash list illustrating one embodiment of the present invention.

FIG. 5 is a block diagram of another HDAG data structure 400 representing a hash list illustrating one embodiment of the present invention. Specifically, data structure 400 is an improvement on data structures 200 and 300. In accordance with the embodiment illustrated in FIG. 5, the number of size labels 402 that are verified per period are reduced to 1 by making the data structure 400 a list of lists where there is one sublist per period and by only labeling the start of each sublist with size information. It should be noted that the loss of the other size information is unimportant because that information is unnecessary to prove the size of the entire current list. However, verification speed is unimproved because the new period's sublist's size must be determined in order to determine that the new list's size is correct. This involves traversing the entire new sublist. This is addressed in following embodiments.

Figure 6:
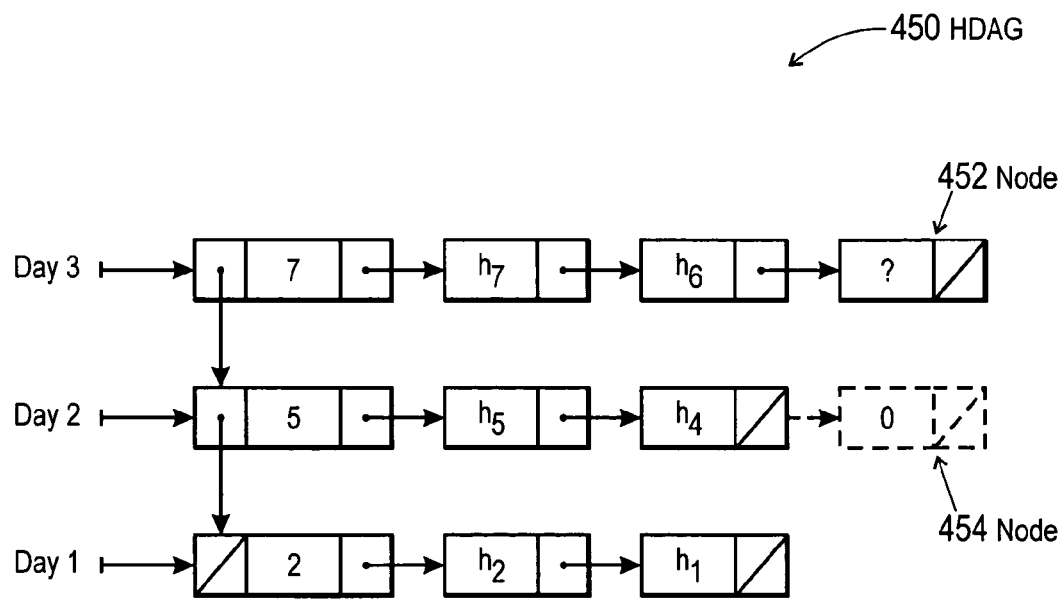
FIG. 6 illustrates an exemplary HDAG illustrating one embodiment of the present invention.

FIG. 6 is a block diagram of an exemplary HDAG 450 illustrating one embodiment of the present invention. Specifically, HDAG 450 illustrates that computing the size of each sublist (e.g., as discussed regarding data structure 400) can be eliminated by defining the effective size of a sublist to be the difference between its size label and the size label of the immediately following sublist (0 if none). That is, if a sublist has more elements than its effective size, the extra elements (e.g., node 452) at the end are ignored. If the sublist has fewer elements than its effective size, operations proceed as though it has as many 0 elements (e.g., node 454) at the end as necessary to reach its effective size. HDAG 450, under this interpretation, encodes the same underlying list of document hashes as the previous figures (i.e., FIGS. 2-5) if it is assumed that $h_3$ equals zero. The resulting data structure can be verified in unit time by checking that the new size is greater than the previous period's size and that the pointer to the previous period's HDAG indeed points to the HDAG whose root hash was published during the previous period.

Figure 7:
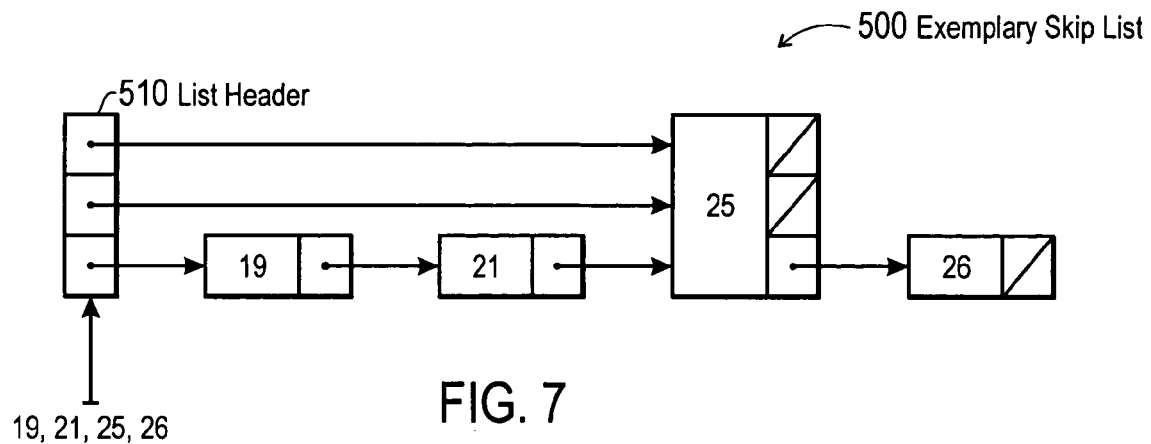
FIG. 7 illustrates an exemplary skip list illustrating one embodiment of the present invention.

FIG. 7 is a block diagram of an exemplary skip list 500 utilized in a system 502 in accordance with embodiments of the present invention. Skip lists are defined in William Pugh, *Skip Lists: a Probabilistic Alternative to Balanced Trees*, Workshop on Algorithms and Data Structures (1990) at http://citeseer.ist.psu.edu/pugh90skip.html, which is incorporated herein by reference. In a worst case situation, proving that the ith element from the end of the hash list is h requires O(D) steps under all of these data structures 200, 300, 400, and 450. Addressing this includes changing the archive data structure so that the backbone list (the list of sublists) can be traversed, as well as any sublist, in faster than linear time. This is done for the backbone list by changing it from a simple linked list to an append-only persistent skip list. Skip lists can be traversed in O(log T) expected time, where T is the length of the skip list. Appending a new node to the front takes O(log T) expected space. If the number of pointers for a given node is chosen deterministically instead of probabilistically (not shown), then these times are made deterministic.

Figure 8:
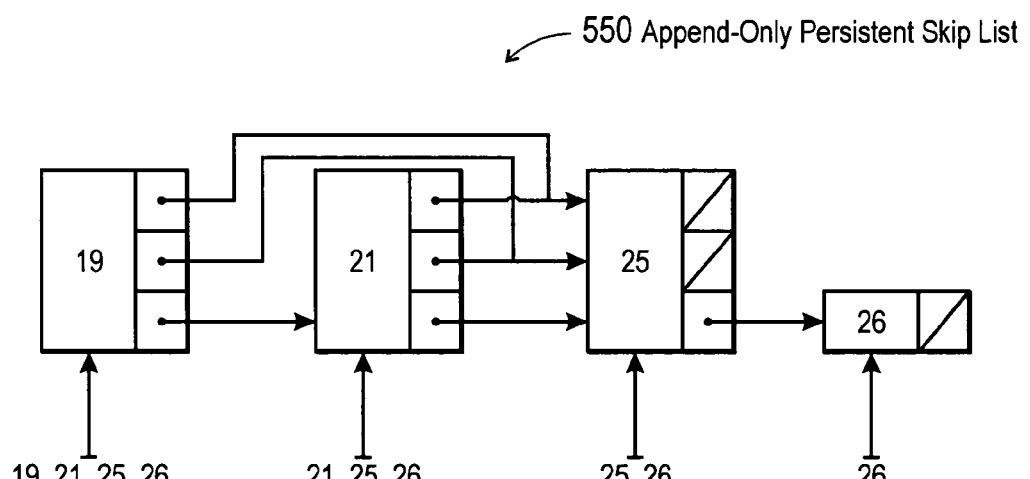
FIG. 8 illustrates append-only persistent skip lists illustrating one embodiment of the present invention.

FIG. 8 is a block diagram of an append-only persistent skip list 550 utilized in a system 552 in accordance with embodiments of the present invention. To turn a normal skip list into an append-only persistent skip list, in accordance with embodiments of the present invention, it suffices to add the extra pointers to each node that would have been present in the list header 510 when that node was at the head of the list. An append of a single node to such a list can be verified in O(log T) expected time by the following procedure: (i) check that the new root node has at least as many pointers as the previous root node; (ii) check that newly added pointers are null; (iii) check that all old pointers have the same values as they did in the previous root node except that the bottom j pointers, j>0, point to the previous root node (j is the height/level of the previous root node).

Figure 9:
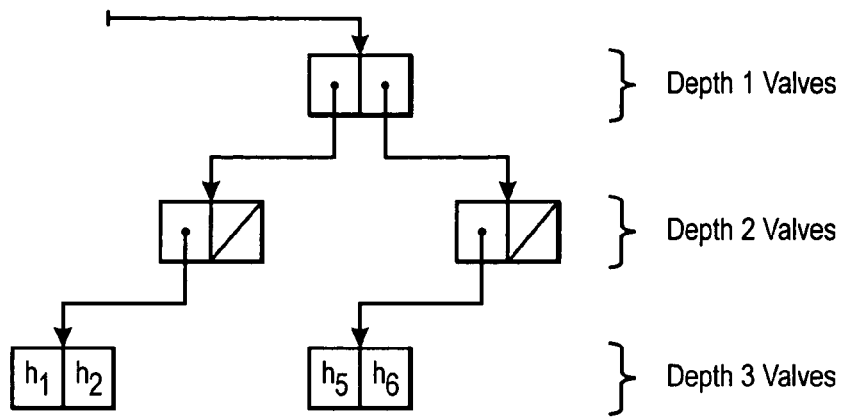
FIG. 9 illustrates an exemplary tree and its interpretation under a range of effective sizes illustrating one embodiment of the present invention.

FIG. 9 is a block diagram of an exemplary tree 600 and its interpretation 602 under a range of effective sizes illustrating one embodiment of the present invention. Improving the traversal speed for the sublists is achieved by changing them from simple linked lists to complete ordered binary trees whose contents are interpreted as follows: let d be log s rounded up, where s is the sublist's effective size (note that the sublist's effective size is determined from the size labels of the backbone list); that is, $2^{d-1} < s <= 2^d$. It should be noted that there will be $2^d$ values from left to right in the tree at depth d if the tree is complete and of depth at least d. If the tree is not complete or is of insufficient depth, as many imaginary nodes containing zero data values are inserted as designated to make it complete and of the designated depth. The sublist elements are then considered to be the first s of the depth d elements. This new data structure can still be verified in unit time, but it is now possible to reach the jth element of the sublist in O(log s) time.

Figure 10:
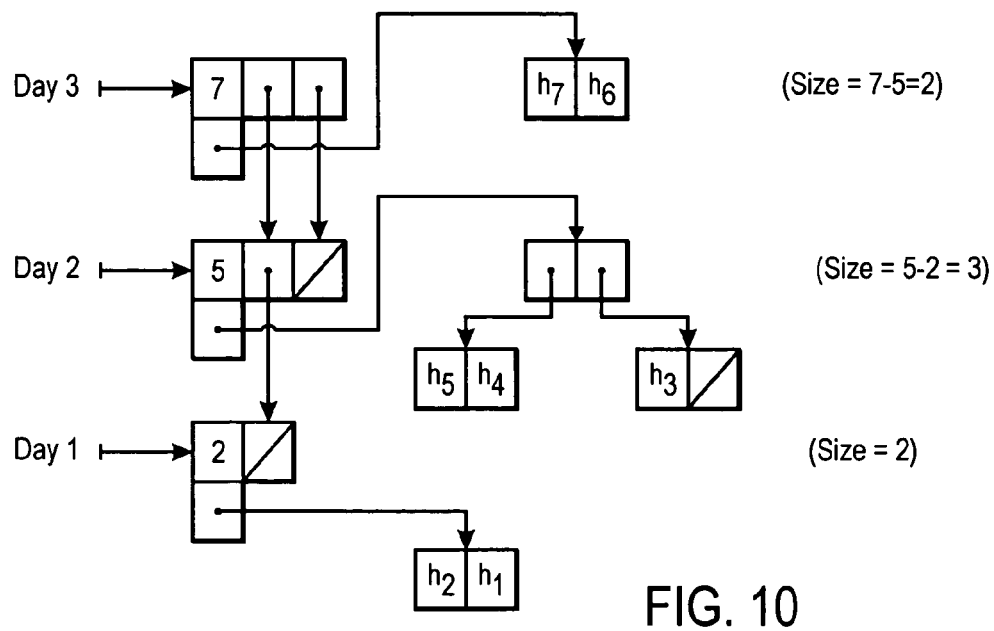
FIG. 10 illustrates an HDAG illustrating one embodiment of the present invention.

FIG. 10 is a block diagram of an HDAG 650 illustrating one embodiment of the present invention. Specifically, HDAG 650 is an example of how the data of FIG. 3 looks using the data structure ideas presented in FIGS. 8 and 9. Combined, the two changes presented with regard to FIG. 8 (using append-only persistent skip lists for the backbone list) and 9 (using trees for the sublists) allow the following exemplary operation efficiencies (variables defined below):

prove size of archive list is D: O(1)
prove that the ith element from the end is $h_i$: O(log D)
verify new root hash using yesterday's root hash: O(log T)

In turn, this means the archive's overall efficiencies using Embodiment A are:

size of document ID: log max possible D
insert a document: O(L+log D)
retrieve a document (valid ID case): O(L+log D)
retrieve a document (invalid ID case): O(1)
list the document IDs of all the document instances (including deleted ones): O(1)
verify new root hash using yesterday's root hash: O(log T)

It should be noted that L is the length of the relevant document, D is the number of insertions to the archive so far, and T is the number of new root hashes that have been published (a.k.a., the number of days the archive has been in operation). The list-document-IDs operation is particularly fast because the ID space is continuous under this approach: in particular, 1 . . . D is represented in O(1) space.

While Embodiment A yields short document IDs, valid retrieval has an a O(log D) proof Moreover, this proof is based on the latest published HDAG, which affects caching documents. Embodiment B addresses potential drawbacks by using longer document IDs. In particular, it uses a document's hash as its document ID. Under this approach, proofs are unnecessary in the case of retrieving a valid document ID. Instead, the client or user checks that the returned document's hash matches the requested document ID. The HDAG is used here primarily to let the archive reject invalid document IDs, and thus consists of a simple list of the document IDs issued to date. Since a document's document ID is its hash, this list can also be considered a list of the hashes of the documents inserted to date. The important proofs for this approach have the following forms: (1) hash h is not in the hash list and (2) hash h is in the hash list (this is needed for verifying insertion).

Because any given document has exactly one hash (under a given hash function) and hence exactly one possible document ID under embodiment B, documents under this embodiment can have only one document instance. Accordingly, if clients do not wish to share document instances they will have to use the prepended number trick described earlier.

Figure 11:
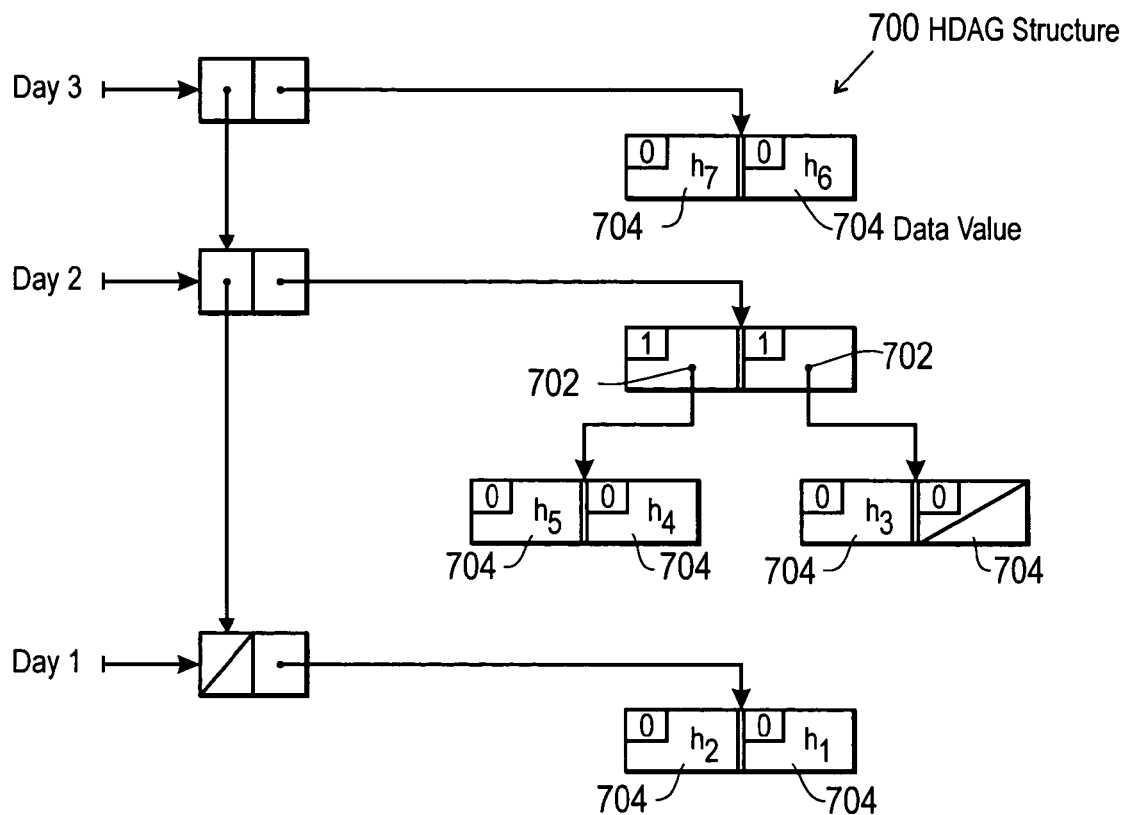
FIG. 11 illustrates a list of lists HDAG structure illustrating one embodiment of the present invention.

FIG. 11 is a block diagram of a list of lists HDAG structure 700 illustrating one embodiment of the present invention. Specifically, as illustrated, in the list of lists structure 700 each sublist is an ordered binary tree. In the list of lists structure 700 the sublist binary tree nodes have two parts, each of which is either a hash pointer 702 to another binary tree node or a data value 704; these two possibilities are distinguished by an extra bit. In one embodiment of the present invention, if the archive balances its trees, then the hash inclusion proof for hashes contained in the most recent sublist uses O(log s) space, where s is the number of documents inserted today.

When a document is inserted again in an archive using embodiment B, the computer archive system determines whether to add an additional copy of that document's hash to the sublist describing the current period or to refer back to the copy of that document's hash that was added to the list when that document was first inserted. The archive system refers to some copy of the document's hash in order to convince the client or other user that the document is (now) in the archive. Archive system procedures can reuse existing hash value copies in order to conserve space in case applications repeatedly insert the same documents over and over again. Doing so requires being able to produce small hash inclusion proofs for hashes contained in sublists describing earlier periods. This is accomplished by changing the list backbone from a simple linked list to an append-only persistent skip list (as in Embodiment A; not shown); this change allows the inclusion of any hash to be proved in O(log D) steps.

Figure 12:
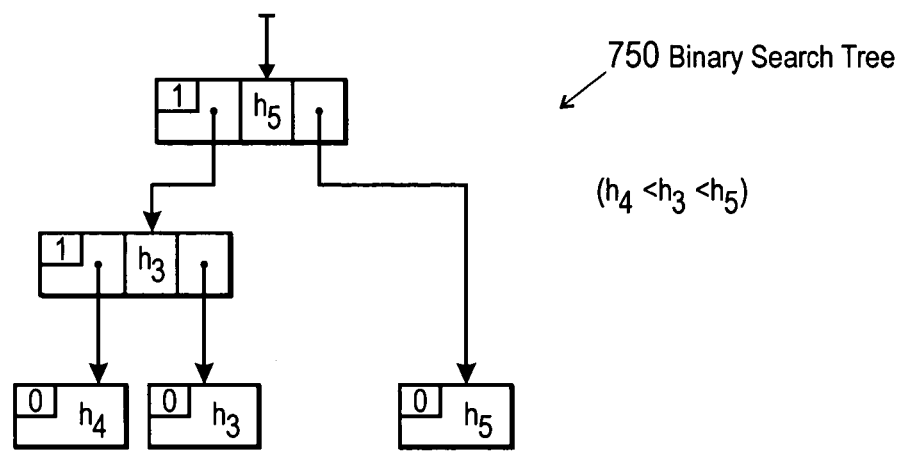
FIG. 12 illustrates a binary search tree illustrating part of one embodiment of the present invention.

FIG. 12 is a block diagram of a binary search tree 750 illustrating part of one embodiment of the present invention. Specifically, binary search tree 750 is an example of how a sublist describing a subsequent period is represented (day 2 of FIG. 11 is shown assuming $h_4 < h_3 < h_5$). The hash exclusion proof can be inefficient in Embodiment B (the data structures of FIG. 11 use O(D) steps) when keeping new-root-hash verification fast. Efficiency can be increased at the expense of additional archive storage space by using binary search trees (e.g., binary search tree 750) instead of simple binary trees for the sublists. The data values in binary search trees are arranged in sorted order. Non-leaf nodes contain a key larger than any of the data values found in that node's left subtree and smaller or equal to any of the data values found in that node's right subtree. This means that in addition to proving that a particular hash is contained in a particular search tree in O(log s) steps, a proof can be made that a particular hash is not contained in a search tree in O(log s) steps. Given the committed-to keys, there is a single path from the root to where a given hash can be correctly placed. Showing that it is absent from that single path suffices to prove that it is absent from the tree. Using this property, hash exclusion proofs can be reduced to O(T log s') steps where T is the number of periods the archive has been operating and s' is the average number of documents added per period. Accordingly, an archive system's overall efficiencies using Embodiment B (reusing hash copies) are:

size of document ID: size of the used cryptographic hash (e.g., 128 bits for MD5, 160 bits for SHA-1)
insert a document: O(L+log D)
retrieve a document (valid ID case): O(L)
retrieve a document (invalid ID case): O(T log s') [or O(D)]

list the document IDs of all the documents in the archive (including deleted ones): O(D)

verify new root hash using yesterday's root hash: O(log T)

For many applications in accordance with embodiments of the present invention, time is unimportant in the case of invalid document ID retrieval, because that case occurs by mistake. However, this is not true for all applications. Accordingly, Embodiment C provides improved invalid-document-ID case retrieval time by using slightly longer document IDs. The document ID for a document under Embodiment C consists of that document's hash (as in Embodiment B) combined with a round number. The round number indicates the insertion round of which that document instance was part. In some embodiments of the present invention, document instances are inserted into the published archive in batches called rounds once a period to reduce the number of HDAG root hashes that need to be published and verified. Accordingly, round numbers are assigned sequentially starting from one. If the archive system publishes a new HDAG root hash once a period, then the current round number is effectively the number of periods the archive has been in operation. Under embodiment C, each document can have at most one document instance per round.

Figure 13:
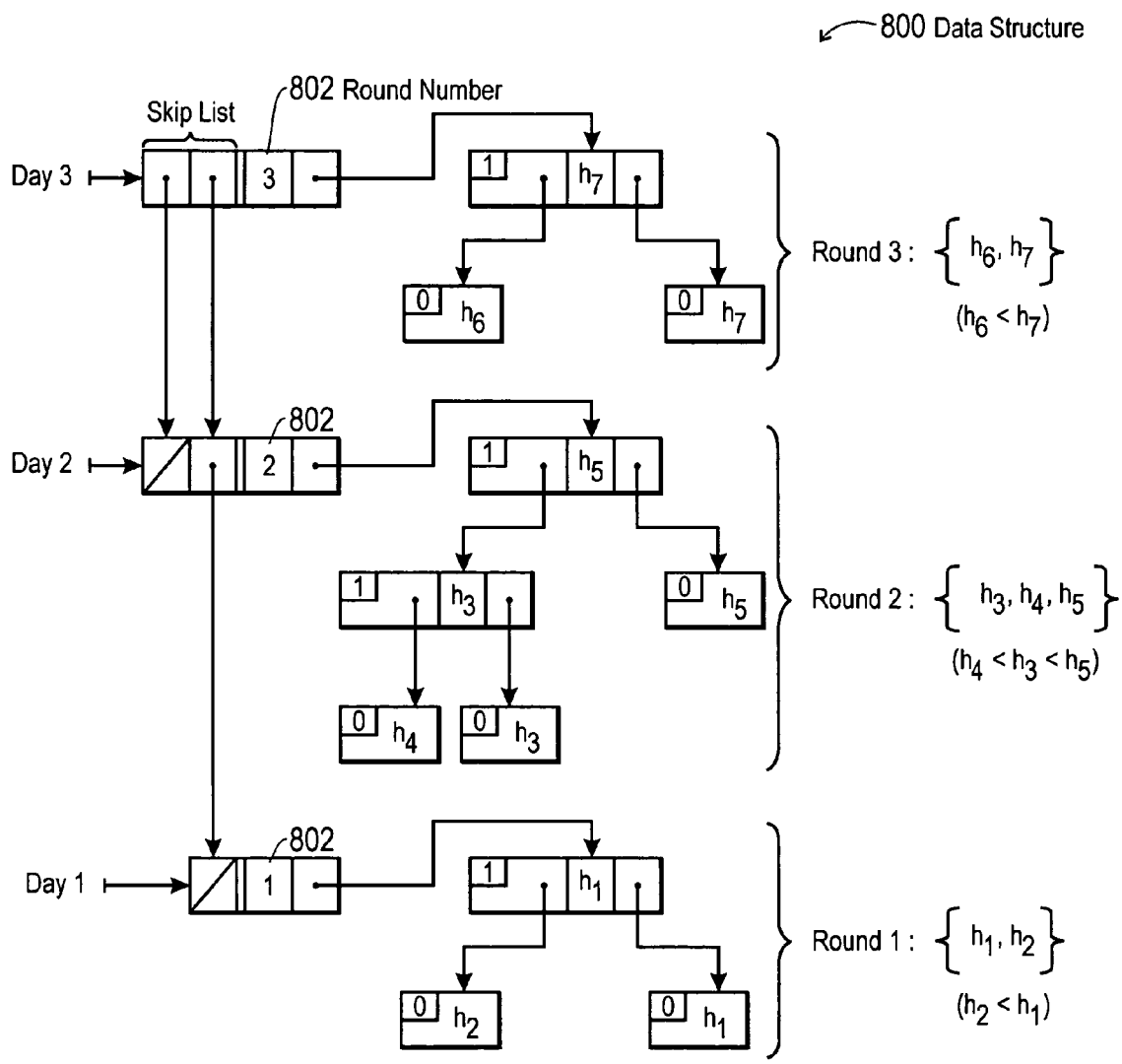
FIG. 13 illustrates an exemplary HDAG data structure illustrating one embodiment of the present invention.

FIG. 13 is a block diagram of an exemplary data structure 800 illustrating one embodiment of the present invention. Specifically, data structure 800 incorporates round numbers 802 representing periods (Embodiment C). The incorporation of round numbers means that proving that a document ID is invalid includes proving that its hash is absent from that particular round. In contrast, under Embodiment B it includes proving that the document's hash is absent from any round. By combining data structure concepts from the previous approaches, this can be done in O(log D) steps. For example, a list of lists structure is used where there is one sublist per day and where a sublist corresponds to one round. The last sublist contains round 1, the penultimate sublist contains round 2, and so on. By using binary search trees for each sublist (as in Embodiment B) it can be proven that a given round is without a given hash in O(log s) steps, where s is the size of that round. In order to be able to reach a given round quickly, an append-only persistent skip list with labels (as in Embodiment A) is used for the backbone list. Instead of size labels, round number labels are used in the backbone. The extra information provided by the size labels are unnecessary here, and would put an extra verification burden on the clients. Round number labels, by contrast, are readily verifiable because each one is one greater than the previous one. Accordingly, a given round is provably reached in O(log T) steps while verifying root hashes require only O(log T) verification time (see FIG. 13). Accordingly, an archive system's overall efficiencies using Embodiment C (reusing hash copies) are:

size of document ID: size of the used cryptographic hash+log max
  possible T
  insert a document: O(L+log D)
  retrieve a document (valid id case): O(L)
  retrieve a document (invalid ID case): O(log D)
  list the document IDs of all the document instances (including deleted ones): O(D)
  verify new root hash using yesterday's root hash: O(log T)

Embodiments of the present invention also relate to the proof of document insertion times. Such proofs are important to clients, other archive system users, and third-parties. For example, a client wishing to prove when a document instance was inserted into the archive system to either another client or to a third-party (e.g., a court during legal proceedings) can utilize embodiments of the present invention. Indeed, embodiments of the present invention allow this operation to be supported at minimal cost. It suffices to simply timestamp, using an existing timestamp service (e.g., www.surety.com), each new period's HDAG root hash. In addition to a pointer to the previous period's HDAG, the new HDAG includes the timestamp of the prior period's HDAG. In this way, the currently committed copy of the archive will include a timestamp per round of inserted documents. A proof of when a document instance was inserted into the archive then consists of a proof that that document instance was first inserted in a particular round combined with the timestamp for that round.

Under Embodiments A and C, to show which round resulted in the generation of a given document ID is straightforward: simply traverse the list backbone until the round with the matching round number (Embodiment C) or size labels that indicate it contains the relevant document ID (Embodiment A). This takes O(log T) steps since the backbone list is a skip list. Under Embodiment B, a proof of document membership in the archive (O(log D) steps) indicates a round when that document was inserted.

A proof that a given document rather than a given document instance was inserted as part of round r the first time it was inserted into the archive system can be relatively expensive. In one embodiment, in addition to the previous proof showing the document was inserted in round r, a proof is added that the particular document was excluded in rounds 1 . . . r-1. This is a proof that the document's hash is absent from the HDAG of period r-1, which, as discussed above, takes O(D) steps or O(T log s') steps if binary search trees are used.

Document deletion within the accountable archive systems presented above will now be discussed. It is now recognized that it is desirable to use proofs of authorized deletion to enable deletion of files or documents from an archive system while retaining accountability of the archive system. Achievement of this is facilitated in accordance with embodiments of the present invention by setting up agreements such that upon presentation of a valid document ID, the system operator can return either the corresponding document instance or a proof that that document instance was previously deleted according to an agreed-upon policy. The following is an example of such a policy: "a document with cryptographic hash H can be deleted when the archive operator is presented with a request to delete the document with hash H digitally signed by the client." It should be noted that, in accordance with embodiments of the present invention, such a digitally signed request can be presented to demonstrate that the document was properly deleted. Indeed, embodiments of the present invention provide affirmative proofs of the following form: "unless certain cryptographic primitives can be broken, a certain statement is true."

Figure 14:
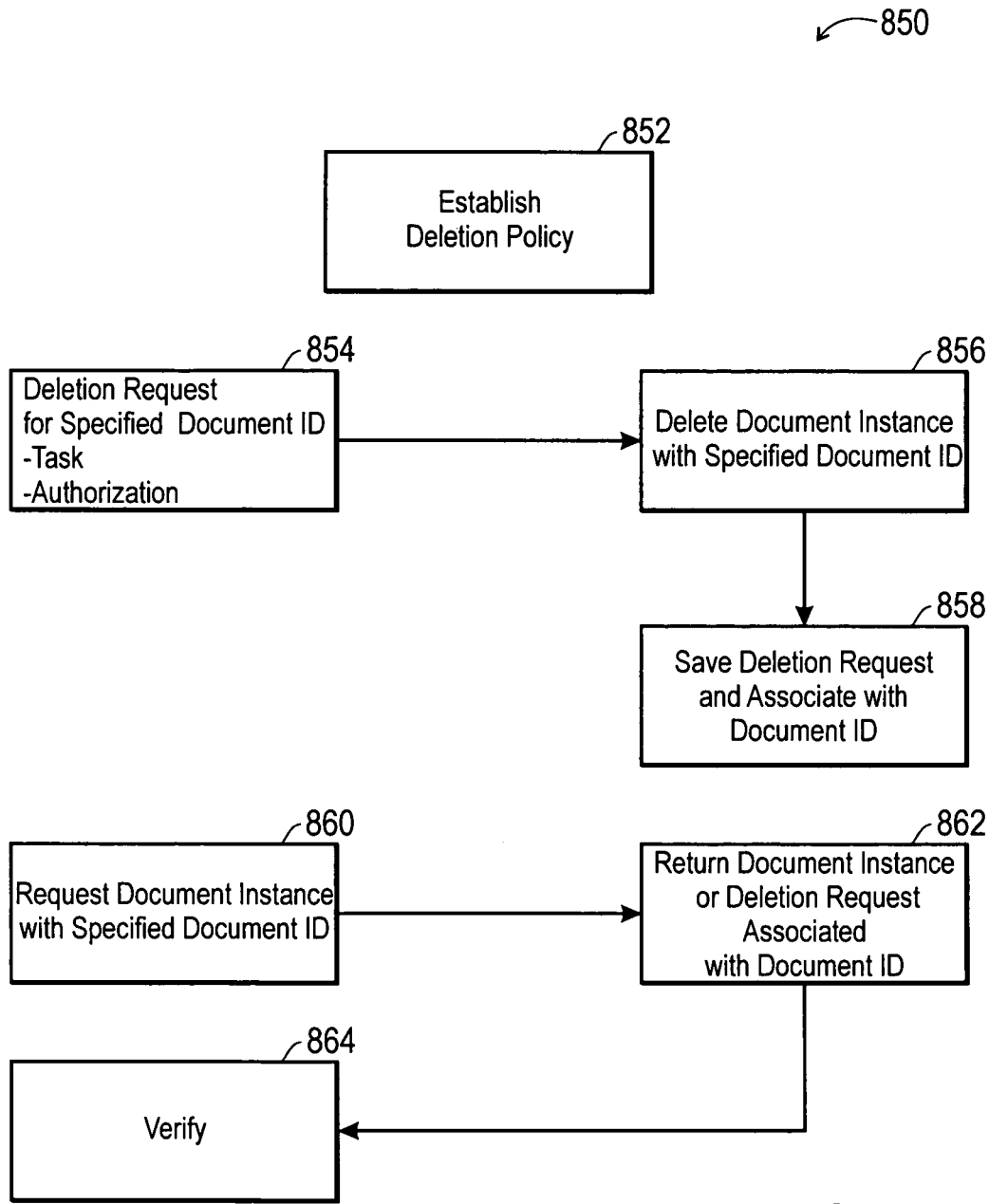
FIG. 14 is a block diagram illustrating a method of document instance deletion using a deletion policy illustrating one embodiment of the present invention.

FIG. 14 is a block diagram illustrating a method of document deletion using a deletion policy (e.g., an accounting policy, a legal policy, a business policy, a tax policy, a government policy, or a retention time policy) illustrating one embodiment of the present invention. The method is generally referred to by reference number 850. Block 852 represents establishing a deletion policy. A deletion policy defines the criteria necessary to authorize deletion of a document (instance). A basic type of deletion policy includes a policy that is unchanging over time and that is indiscriminate regarding documents. For example, such a policy includes a description of which combinations of signatures are authorized to request deletions. A specific example of such a policy is as follows: "a valid deletion request is signed by either employee A or two or more of employees B, C, and D." Such a policy is implemented, for example, when an archive operator is unauthorized to delete documents unless provided with a deletion command that is accompanied by a request of the form "delete the document with document ID X," the request being digitally signed by sufficient parties to authorize the deletion. In one embodiment of the present invention, the sufficiency of the digital signature or signatures is based on a contract that includes the deletion policy and public digital signature keys for each of the approved potential signers.

Block 854 represents a client supplying a deletion request to an archive system operator. As illustrated, the deletion request includes a requested task (e.g., delete the document having document ID X) and a proper authorization. Embodiments can support deletion requests of the form "delete the document instance with document ID X", the form "delete all instances of the document having document ID X", or both. The first form is shown in FIG. 14 and described here. Block 856 represents actual deletion of the document instance having document ID X by the archive system. As illustrated by block 858, in one embodiment of the present invention, to perform an authorized deletion of a document instance having document ID X, the operator erases the document corresponding to document ID X if that document is without remaining undeleted document instances and saves the request (e.g., block 854), associating it with document ID X. Should the client later ask for document ID X (block 860), the operator returns the deletion request (block 862) it received for document ID X instead of the deleted document instance. (If the deletion request was of the form "delete all instances of the document having document ID Y" where Y is different from X, the archive will supplement the deletion request with a proof that document ID X and document ID Y refer to documents with the same hash.) If the client asks for document ID X before the deletion but after that document instance was created, the operator replies by returning the document itself (block 862). In block 864, the client then verifies such replies to ensure that the operator was actually authorized to delete the document instance or that the document is the correct document. If the verification fails, the client is made aware that the archive operator has violated the contract. Without illustration in FIG. 14 is the invalid document ID case where X is not a valid document ID. In this case, a proof to that effect is returned in step 862 and verified in step 864.

Figure 15:
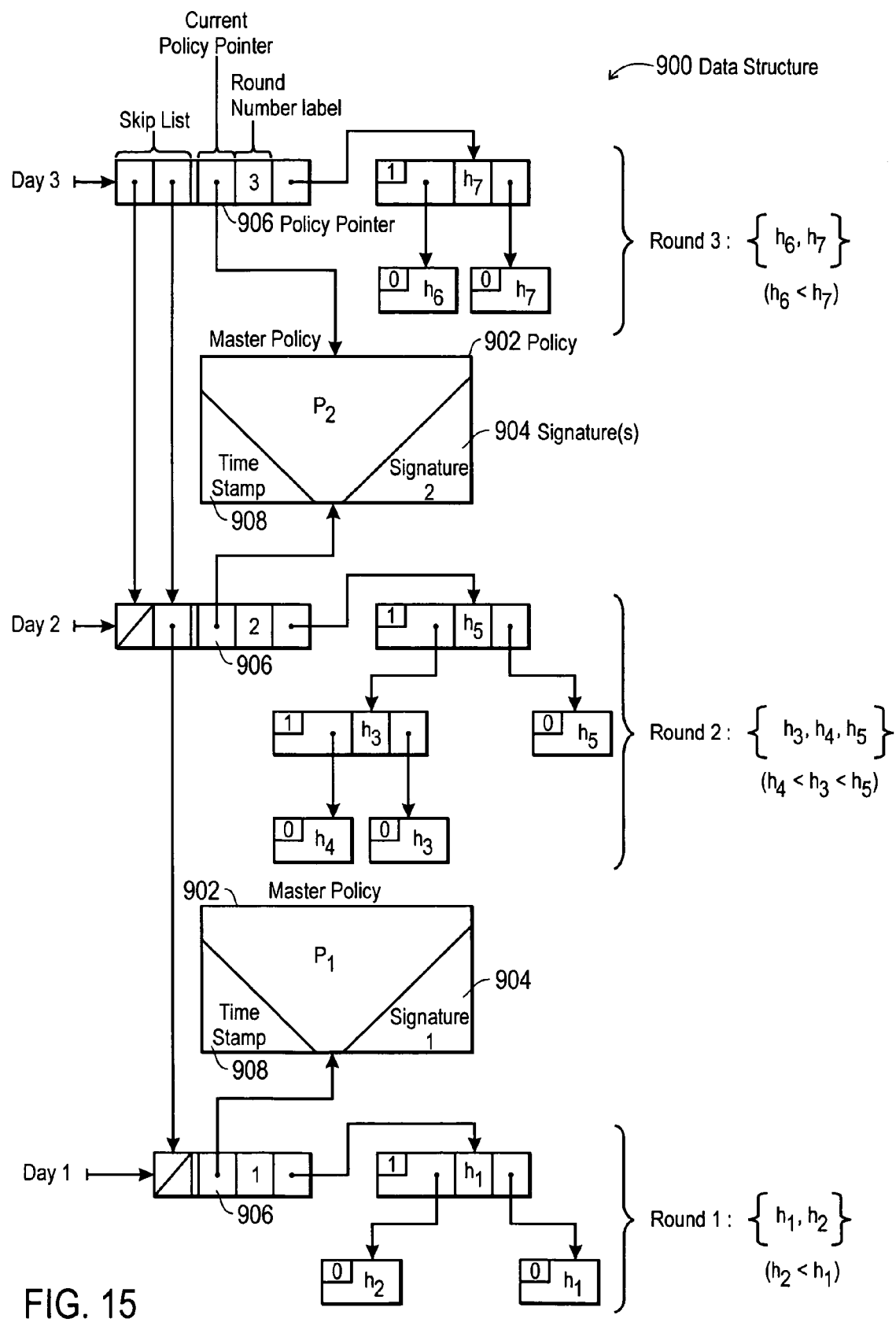
FIG. 15 is a block diagram of an exemplary data structure illustrating one embodiment of the present invention.

FIG. 15 is a block diagram of an exemplary data structure 900 illustrating one embodiment of the present invention. Specifically, data structure 900 is a detailed version of data structure 800 (see FIG. 13) illustrating (deletion) policy replacement over time. For example, in one embodiment, the archive maintains a time sorted (most recent first) list of current and past policies in a machine-readable form. Accordingly, each policy and deletion request is time stamped (e.g., timestamp 908) via a contract-specified digital notary (before being signed). This allows a particular request to be matched up with the policy in force when it was made.

In one embodiment, a policy is in force until it is replaced. Exemplary policies 902 are illustrated in FIG. 15 as $P_1$ and $P_2$, wherein $P_2$ replaces $P_1$. These policies (e.g., $P_1$ and $P_2$) are signed with digital signature(s) 904 to authorize their replacing the immediately preceding policies. For example, signature 2 attached to $P_2$ authorizes $P_2$ replacing $P_1$. It should be noted that the policies can have pointers to sub-policies in accordance with some embodiments. What combination of signatures are sufficient to authorize replacing the current policy or one or more of its sub-policies can be specified by a combination of the archive's contract and the contents of the current policy. Less strict authorization can be required to change a sub-policy than to change the entire policy; different sub-policies can have different authorization requirements. Further, it should be noted that while data structure 900 illustrates an embodiment that facilitates deletion in an accountable archive system specifically directed to Embodiment C, one of ordinary skill in the art will recognize that this is merely one example. Indeed, the deletion features apply to all of the embodiments set forth herein, including Embodiments A, B, and C.

In FIG. 15, the archive's HDAG's root node includes a current policy (hash) pointer 906 that points to the current policy 902. The policies 902 are digitally time stamped 908. As discussed above, data structure 900 records that the archive began operating under policy P1 (on day 1), which was later replaced by policy P2 (on day 2). The current policy was unchanged from day 2 to day 3. Indeed, in the illustrated embodiment, policies are replaced once a day or less frequently. In other embodiments, more frequent replacement is desirable and the pointer to the current policy (e.g., P1 on day 1) can be replaced with a pointer to a list of the new policies initiated that day In addition to verification of the new published root hash, as set forth above regarding block 19 in FIG. 1, the client also verifies the new root node's current policy pointer 906. In one embodiment, this verification is performed one or more times per period (e.g., day). If the client determines that the current policy 902 differs from the previous period's policy 902, the client verifies that (1) the new policy 902 is correctly formatted, (2) it has a valid and proper time stamp 908, and (3) it is authorized (e.g., its signature(s) 904 are sufficient to authorize its replacing the previous period's policy 902; if its signatures only authorize replacing part of the previous policy, the client verifies that only that part of the new policy is different from the previous policy). Policy replacement, like deletion, is implemented based on authorization to prevent archive operators from installing a new policy 902 specifically to allow an otherwise unauthorized deletion of a document. In one embodiment of the present invention, a replacement policy is present in a written contract facilitating confirmation that a given policy 902 is an authorized replacement for another policy 902. Examples of replacement policies include: "the new policy is signed by one of signatures A, B, or, both C and D," "the new policy is signed by one of the combinations of digital signatures listed in the current policy as authorizing replacement," or a combination of these. An exemplary combination includes policies requiring more authorization to replace themselves than was required to install them. This exemplary combination is useful when a deletion freeze is implemented wherein no documents can be deleted and wherein a limited number of individuals are designated as authorized to lift the freeze (e.g., during litigation procedures).

While a fixed policy can be used, in the embodiment illustrated by FIG. 15, deletions are handled using the current policy 902 in force at the time of the deletion (e.g., P1 for day 1 and P2 for days 2 and 3) rather than using a fixed policy. The current policy 902 in force is used to determine which deletions are authorized. Further, the archive only honors requests that carry a valid digital time stamp 908 that approximately reflects the current time and is more recent than the time stamp 908 for the current policy 902. The reply supplied when a deleted document instance is requested includes (1) the authorizing deletion request and (2) a proof that the policy in effect when the request was time stamped was a particular policy (e.g., policy $P_2$). The latter proof is obtained in $O(\log T)$ steps by performing a binary search on the current archive HDAG backbone skip list for the most recent policy whose time stamp is before that of the request, where T is a number of rounds thus far. This is facilitated because the time stamps of the policies are in reverse order. The client checks the proof and verifies that the deletion request was authorized by the returned policy. It should be noted that this use of time stamps prevents new deletion requests from taking advantage of prior lax policies.

In accordance with embodiments of the present invention, complicated policies can be divided into multiple parts each having different replacement requirements. This can be beneficial, for example, when it is desirable for separate entities to be responsible for maintaining separate policy components. In a specific example, a tax department can be responsible for maintaining parts of a policy dealing with tax documents, while a customer support department is responsible for maintaining parts of the policy dealing with employee manuals. This can be implemented using an HDAG instead of a single node for a policy. For example, in accordance with embodiments of the present invention, P1 and P2 in FIG. 15 can represent HDAGs rather than single nodes.

Embodiments of the present invention provide document specific policies, wherein policies apply different authorization requirements to different categories of documents. In one embodiment of the present invention, a document is divided into two pieces, which include the original document and a "summary" of the original document that is referred to herein as a "clip." The clip can include labels relating to the original document, access control information (e.g., document owner or who is entitled to delete), and so forth. Specifically, for example, a clip can include the document title, a record retention code, a type (e.g., file type), or a scheduled date for deletion. The information stored in a clip facilitates policy determination: Although the original document is destroyed upon deletion, the clip is retained. This allows deletion policy to depend on the contents of clips. For example, a policy can include a statement such as the following: "any document with a record code of 48 can be deleted by anyone five years after the entry date of record." Note that deletion policies must be independent of information in a document that is unavailable in its clip because it is unverifiable whether the deletion request was authorized after the document is deleted. Deletion policies can, however, depend on when a document instance was first inserted because that information remains after deletion in the HDAG.

Clips typically exclude information having a high potential for deletion because the clip itself will remain undeleted. Indeed, in one embodiment of the present invention, deletion of the document instance erases the first piece (i.e., the original document) without erasing the second piece (i.e., the clip). This enables authorization proofs to refer to the clip and hence policies can treat documents with different clips in different ways. In accordance with embodiments of the present invention that utilize clips, instead of the archive system mapping document IDs to hashes of the original documents, it maps document IDs to the hashes of document clips. The clips, in turn, contain hash pointers to their original documents. The retrieve valid-document-ID case thus consists of returning the clip corresponding to the given document ID, along with any necessary proofs of this, followed by either a proof of authorized deletion (which can refer to the clip) or a copy of the original document. The client verifies that any document returned has the hash given in the clip for the original document.

In one embodiment of the present invention, to provide correspondence between a document and its clip, a document submitter (e.g., client) establishes clip fields as desired based on the document's contents. Further, an audit machine can be used to verify that newly inserted clips match their associated documents. If the clip fields are mechanically unverifiable, a human can be assigned to periodically check a sampling of documents. Indeed, in one embodiment, an audit machine can bring suspicious documents (e.g., a document containing the keyword tax that has not been marked as a tax document) to the attention of a human.

It is desirable to be able to change the information contained in a clip, such as when a classification error is discovered. Changing or updating information in a clip can be achieved in two ways in accordance with present embodiments. In a first procedure, a policy can contain a list of clip replacements (e.g., "document ID 5203's clip is now C2, document ID 17,014's clip is now C3, ... "). Specifically, a document (instance) having a particular document ID has a clip at time T assigned to it by the policy in force at time T (if any), otherwise it is the clip with which it was inserted into the archive. It should be noted that the list is efficiently searchable (e.g., a balanced binary search tree) to facilitate a proof that a particular document ID has a clip that is C short. Note that each policy's clip-replacement list is independent of the others. While allowing efficient searching, automatically including the previous policy's list (in particular, in a quickly verifiable way) in a new policy is disallowed: The routine verification of new policies done by clients is without sufficient time to check that the new policy includes all the clip updates of the previous policy. However, this check can be done by the audit machine if desired.

In a second procedure, a conceptually-separate accountable persistent modifiable store is utilized to store clip updates. Such a store upon retrieval produces proofs of the form "variable X was bound to value V (was unbound) at time T." In embodiments using the second procedure, a document (instance) with document ID X's clip at time T is determined by looking up variable X's value at time T: the clip is C if the modifiable store says variable X's value at time T is C and document ID X's original clip if variable X was unbound at time T. The modifiable store's modification policy enables the archive's current policy to individually specify the authorization required to update clips in a manner similar to deletion authorization. The modifiable store can be non-persistent. Indeed, by saving its proofs, it is unnecessary to ask about the value of any variable at any time other than the current time. For example, when the archive accepts a deletion request, it saves the proof of the value of deleted document's clip at the time of the deletion along with the deletion request itself This avoids the need to look up that clip's value in the past when the deletion request is later verified by a client.

Some embodiments represent an original document using a group of pieces rather than just two pieces. Different documents can be divided into different pieces according to various procedures. It should be noted that for each subset (including the overall set) of pieces, a different deletion operation with different authorizations can be defined. The authorization for a given deletion can refer to any of the pieces that will remain after that deletion and the time the given document ID was added to the archive. Under such embodiments, the archive maps document IDs to HDAGs whose leaves are the pieces representing the associated original document.

Figure 16:
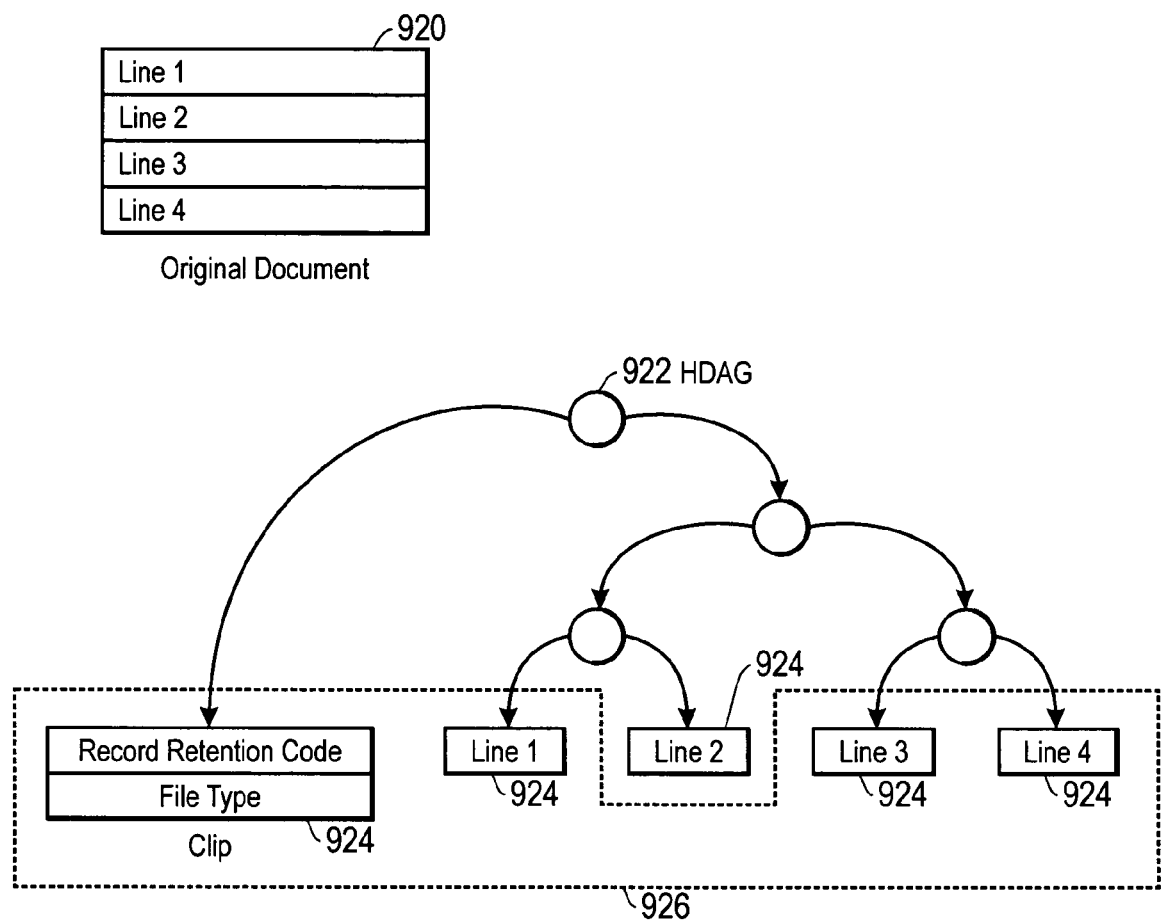
FIG. 16 is a block diagram of an original document and an HDAG of pieces representing the document illustrating one embodiment of the present invention.

FIG. 16 is a block diagram of an original document 920 and a HDAG 922 of pieces 924 representing the original document 920. An example piece division shown in FIG. 16 includes dividing a document such that there is a single piece per line of the document plus a clip, which allows deletion of an arbitrary subset of the document's lines based on the content of the remaining lines. This allows policy statements such as "employee A is authorized to delete any document containing the keyword K" to be employed. In one embodiment of the present invention, to prove that a deletion based on such a policy statement was properly authorized, a line including the keyword (e.g., keyword K) is left undeleted. For example, if keyword K was present in line 2 of original document 920, employee A can cause the archive to forget the HDAG nodes in set 926; the remaining HDAG nodes are sufficient to prove that original document 920 contained the keyword K.

An alternative to using clips includes having a trusted third-party oracle that will provide confirmations. For example, a third-party oracle can confirm statements such as "the document with hash H does not contain the keyword K" when presented with such a document. When a deletion request is received that is authorized when its target document is without a particular word (e.g., keyword K), the archive requests a confirmatory statement from the oracle and proceeds if it receives one. Further, the archive saves the statement for later use in convincing clients that the deletion was authorized. Because of the confirmation, it is unnecessary to keep a part of the original document (even a summary).

One method of determining what document instances in an archive system have been deleted is to attempt to retrieve every document instance ever inserted in that archive. In one embodiment of the present invention, document instance deletions are logged to provide a capacity to determine what document instances have been deleted without having to retrieve all of the document instances in a system. Indeed, in one embodiment, deletions are logged as they occur. This is done by having the archive insert honored deletion requests into a conceptually separate archive. To prevent the archive from omitting this step, proofs of authorized deletion include a proof that the deletion was properly logged.

In one embodiment of the present invention, documents are maintained indefinitely unless deleted. This requires clips and deletion requests to be kept indefinitely even though the original documents to which they apply have been deleted. An alternative to this indefinite storage is to have all documents expire after some long time period (e.g., 50 years). Specifically, a client chooses one of a number of time periods (including infinity) after which a document expires. In one embodiment, this occurs at the time of document ID insertion. Optionally, new policies can be allowed to decrease expiration periods; increasing expiration periods should be prohibited, however. The only information that need be retained about an expired document is that required to confirm that it was inserted so long ago that it expired. If documents with the same expiration period and insertion time are grouped together (e.g., placed in the same round), the entire group can be forgotten after expiration.

While the invention can be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, trees of any variety can be used instead of binary trees.

What is claimed is:

1. A method of data retention executed by a computer archive system, comprising:
    committing, by the computer archive system, to a plurality of documents by building a hash-based directed acyclic graph (HDAG) using information from the plurality of documents;
    publishing a hash of a root node of the HDAG;
    deleting, by the computer archive system, a particular one of the plurality of documents;
    providing, by the computer archive system, a proof of authorized deletion of the particular document in response to an audit request, wherein the proof of authorized deletion includes a deletion request received by the computer archive system, the deletion request specifying deletion of the particular document;
    maintaining a list of current and past deletion policies for authorization of deletion requests, the list of current and past deletion policies facilitating a determination of which policy is in effect at a given time; and
    verifying that the deletion request is authorized, wherein verifying that the deletion request is authorized includes verifying that the deletion request complies with a designated deletion policy in effect at the time of the deletion request as designated by the list of current and past deletion policies.

2. The method of claim 1, wherein the designated deletion policy is for a specified data category and is selected from a plurality of deletion policies corresponding to a plurality of data categories.

3. The method of claim 1, further comprising automatically deleting data in response to a time deletion policy.

4. The method of claim 1, further comprising logging instances of document deletion.

5. The method of claim 1, further comprising:
    receiving a request to switch to a new deletion policy; and
    verifying that the request to switch is authorized.

6. The method of claim 1, further comprising storing the deletion request for use as part of the proof of authorized deletion.

7. The method of claim 1, further comprising, sending a client the hash of the root node of the HDAG and hashes of the pointers to the children nodes so the client can verify commitment of the plurality of documents.

8. A method of data retention executed by a computer archive system, comprising:
    committing, by the computer archive system, to a plurality of documents by building a hash-based directed acyclic graph (HDAG) using information from the plurality of documents;
    publishing a hash of a root node of the HDAG;
    deleting, by the computer archive system, a particular one of the plurality of documents;
    providing, by the computer archive system, a proof of authorized deletion of the particular document in response to an audit request, wherein the proof of authorized deletion includes a deletion request received by the computer archive system, the deletion request specifying deletion of the particular document; and
    providing the HDAG with a hash pointer to a first deletion policy, wherein the first deletion policy is replaced by a second deletion policy having a time stamp later than the first deletion policy upon receiving authorization.

9. The method of claim 8, wherein the first deletion policy is implemented as a HDAG having a plurality of nodes.

10. The method of claim 8, wherein the deletion request included in the proof is a version of the deletion request digitally signed by the client.

11. The method of claim 8, wherein the audit request includes a request for the particular document, the method further comprising:
    sending, to the client, the proof of authorized deletion including the deletion request, in response to the request for the particular document.

12. A method of data retention executed by a computer archive system, the method comprising:
- receiving, at the computer archive system, a document from a client;
- assigning, by the computer archive system, the document an identification;
- creating, by the computer archive system, a hash-based directed acyclic graph (HDAG) based on information relating to the document and the identification;
- sending to the client a hash of a root node of the HDAG; and
- generating a proof of deletion of the document, wherein the proof includes a deletion request received by the computer archive system, the deletion request specifying deletion of the document, wherein the HDAG includes a hash-pointer that points to a first deletion policy, wherein the first deletion policy can be replaced by a second deletion policy having a time stamp later than the first deletion policy upon receiving authorization.

13. The method of claim 12, wherein the client is sent a path to a node containing the document.

14. A method of assured document retention with controlled deletion, comprising:
- committing to a plurality of documents, wherein committing to the plurality of documents comprises building and publishing a hash-based directed acyclic graph using information from the plurality of documents, the hash-based directed acyclic graph having a hash pointer to a first deletion policy, wherein the first deletion policy can be replaced by a second deletion policy having a time stamp later than the first deletion policy and having proper authorization;
- deleting one of the plurality of documents;
- storing a deletion request for use as part of a proof of authorized deletion;
- maintaining a list of current and past deletion policies for authorization of deletion requests;
- verifying that the deletion request is authorized, wherein verifying that the deletion request is authorized includes verifying that the deletion request complies with a deletion policy in the list of current and past deletion policies;
- receiving an audit request for retrieval of the one of the plurality of documents after the one of the plurality of documents has been deleted;
- providing the proof of authorized deletion of the one of the plurality of documents in response to the audit request;
- receiving a request to switch to a new deletion policy;
- verifying that the request to switch is authorized, wherein verifying that the request to switch is authorized includes retrieving information from a stored copy of the designated deletion policy in effect at the time of the request to switch as designated by the list of current and past deletion policies; and
- adding the new deletion policy to the list of current and past deletion policies so that the new deletion policy is in effect.

* * * * *